(12) United States Patent
Ponsini

(10) Patent No.: US 10,474,454 B2
(45) Date of Patent: Nov. 12, 2019

(54) SYSTEM AND METHOD FOR UPDATING A TRUSTED APPLICATION (TA) ON A DEVICE

(71) Applicant: Oracle International Corporation, Redwood Shores, CA (US)

(72) Inventor: Nicolas Ponsini, Mougins (FR)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/221,004

(22) Filed: Mar. 20, 2014

(65) Prior Publication Data

US 2015/0268952 A1 Sep. 24, 2015

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
CPC .................................... G06F 8/71; G06F 8/65
USPC ......................................................... 717/168
See application file for complete search history.

(56) References Cited

U.S. PATENT DOCUMENTS

| 8,010,810 | B1 | 8/2011 | Fitzgerald et al. | |
| 8,266,433 | B1 | 9/2012 | Przykucki | |
| 8,572,410 | B1* | 10/2013 | Tkacik | G06F 21/72 380/44 |
| 2003/0194085 | A1* | 10/2003 | Dillaway | 380/29 |
| 2005/0144468 | A1 | 6/2005 | Northcutt et al. | |
| 2006/0101454 | A1* | 5/2006 | Whitehead | G06F 21/121 717/168 |
| 2009/0323940 | A1 | 12/2009 | Moffat et al. | |
| 2010/0291904 | A1* | 11/2010 | Musfeldt et al. | 455/414.1 |
| 2012/0102334 | A1 | 4/2012 | O'Loughlin et al. | |
| 2012/0185759 | A1* | 7/2012 | Balinsky | G06F 21/6227 715/209 |
| 2013/0111605 | A1* | 5/2013 | Maeda | G06F 21/60 726/27 |
| 2013/0152180 | A1* | 6/2013 | Nair et al. | 726/6 |
| 2014/0095886 | A1* | 4/2014 | Futral | G06F 21/572 713/187 |
| 2014/0245013 | A1* | 8/2014 | Kim et al. | 713/171 |

(Continued)

OTHER PUBLICATIONS

European Patent Office, International Searching Authority, International Search Report and Written Opinion dated Apr. 30, 2015 for International Application No. PCT/US2014/072843, 10 pages.

(Continued)

*Primary Examiner* — Emerson C Puente
*Assistant Examiner* — Sen Thong Chen
(74) *Attorney, Agent, or Firm* — Invoke

(57) ABSTRACT

A system and method can support device management. A trusted operating system (OS) in a trusted execution environment can store a digest for one or more binary files, which are associated with a trusted application that is deployed in the trusted execution environment. Then, the system can update the trusted application based on one or more updates received from a service provider. Furthermore, the system allows the trusted OS to derive at least one secret bound to the updated trusted application using the digest stored by the trusted OS in the trusted execution environment.

20 Claims, 10 Drawing Sheets

(56) References Cited

U.S. PATENT DOCUMENTS

2015/0006881 A1* 1/2015 Perlmutter ............ H04L 9/0897
713/155
2015/0188944 A1* 7/2015 Dyer ....................... G06F 21/57
726/3

OTHER PUBLICATIONS

OMTP (Advanced Trusted Environment: OMTP TR1, May 28, 2009, 204 pages).
ARM (Building a Secure System using TrustZone® Technology, PRD29-GENC-009492C, Apr. 2009, 108 pages).
Turan et al. (NIST Special Publication 800-132, Dec. 2010, 18 pages).
Unknown Author, Introduction to Cryptography, CS 355, Lecture 34, Key Establishment Protocols, Fall 2005, pp. 1-21, Purdue University. Retrieved from: https://www.cs.purdue.edu/homes/ninghui/courses/Fa1105/lectures/355_Fa1105_lect34.pdf.
"Key Establishment Protocols"—Purdue Univ, Oct. 2005 https://www.cs.purdue.edu/homes/ninghui/courses/Fall05/lectures/355_Fall05_lect34.pdf.

* cited by examiner

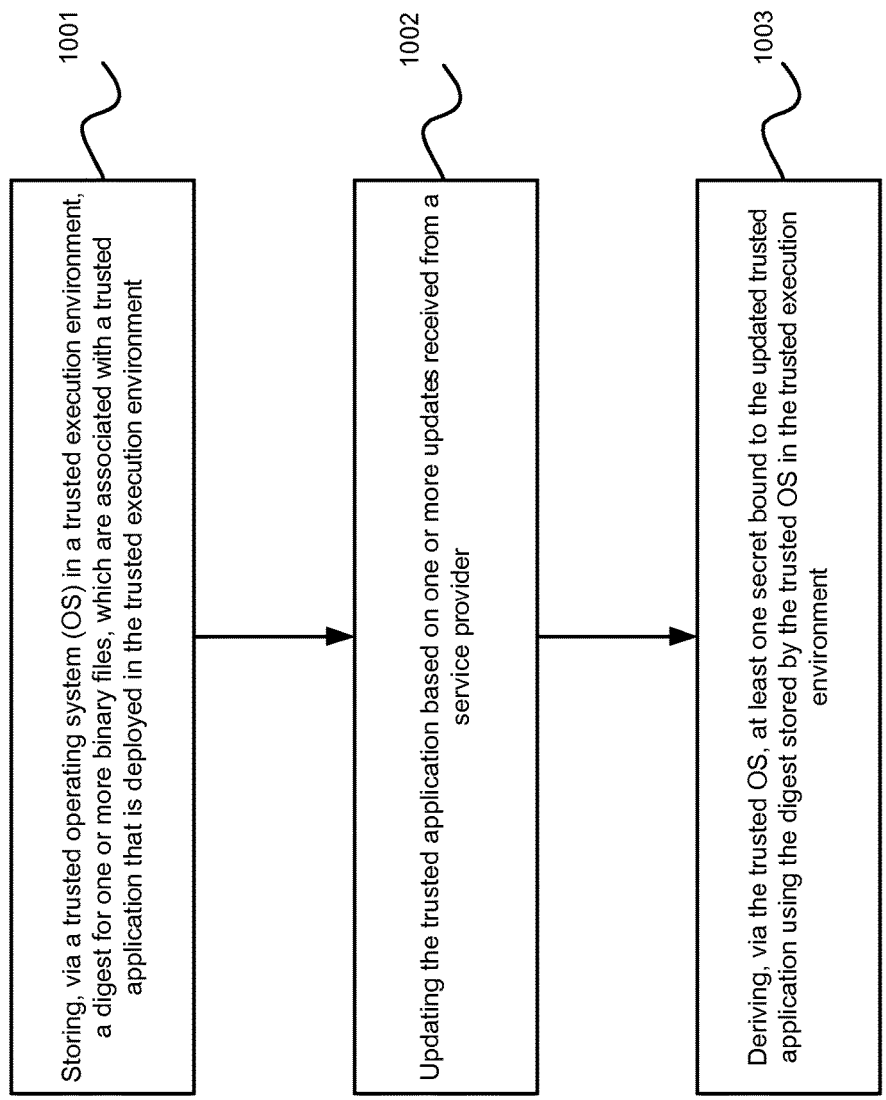

SYSTEM AND METHOD FOR UPDATING A TRUSTED APPLICATION (TA) ON A DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent application(s), each of which is hereby incorporated by reference in its entirety:

U.S. Patent Application titled "SYSTEM AND METHOD FOR SUPPORTING DERIVING SECRETS FROM A MASTER KEY BOUND TO AN APPLICATION ON A DEVICE", application Ser. No. 14/220,988, filed Mar. 20, 2014; and U.S. Patent Application titled "SYSTEM AND METHOD FOR PROVISIONING SECRETS TO AN APPLICATION ON A DEVICE", application Ser. No. 14/221,022, filed Mar. 20, 2014.

FIELD OF INVENTION

The present invention is generally related to computer systems, and is particularly related to device management and security.

BACKGROUND

In the post personal computer (PC) era, businesses often permit employees to bring various mobile devices, such as smart phones, tablets, and laptops, to their workplace. The employees can use those personally owned devices to access privileged company information and applications. The information technology industry has been evolving to promote the secure and interoperable deployment and management of software applications using secure chip technology, e.g. based on the GlobalPlatform. This is the general area that embodiments of the invention are intended to address.

SUMMARY

Described herein are systems and methods that can support device management. A trusted operating system (OS) in a trusted execution environment (TEE) can store a digest for one or more binary files, which are associated with a trusted application that is deployed in the trusted execution environment. Then, the system can update the trusted application based on one or more updates received from a service provider. Furthermore, the system allows the trusted OS to derive at least one secret bound to the updated trusted application using the digest stored by the trusted OS in the trusted execution environment.

BRIEF DESCRIPTION OF THE FIGURES

FIG. 10 illustrates an exemplary flow chart for supporting TA updates in a trusted execution environment (TEE), in accordance with an embodiment of the invention.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Described herein are systems and methods that can support device management.

Exemplary Device Architecture

In accordance with an embodiment, the systems and methods described herein can be implemented as, or used with a device, such as a mobile device (e.g., smart phone), or other device In accordance with various embodiments, the device can be based on a system-on-chip (SoC) architecture. The description of embodiments of the invention provided herein generally uses the ARM SoC architecture as one example of a SoC architecture. It will be apparent to those skilled in the art that, in accordance with various embodiments, other types of SoC architecture can be used, without limitation.

In accordance with an embodiment, an SoC architecture, which includes both hardware and software components, can provide on-chip integration of various types of functional hardware, in order to perform different tasks such as power management, computing, audio/video, graphics, global positioning system (GPS), and radio.

The hardware components in a SoC architecture can include various analog, digital, and storage components. For example, in accordance with an embodiment, the analog components can include analog-to-digital converter (ADC) and digitally controlled amplifier (DCA) components, phase-locked loop (PLL) components, transmitting (Tx)/receiving (Rx) components, radio frequency (RF) components. The digital components can include various processors, interfaces, and accelerators. The storage components can include static random-access memory (SRAM), dynamic random-access memory (DRAM), non-volatile storage components such as flash memory, and read-only memory (ROM). Additionally, the SoC can contain programmable hardware, such as field-programmable gate array (FPGA), mixed signal blocks, and sensors.

In accordance with an embodiment, a SoC architecture can include both on-chip and off-chip software components. For example, the software components in a SoC architecture can include a real-time operating system (RTOS), device drivers, and software applications.

Additionally, in accordance with an embodiment, a SoC architecture can take advantage of various portable/reusable components and/or circuit designs, embedded CPU, embedded memory, and real world interfaces such as universal serial bus (USB), peripheral component Interconnect (PCI), and Ethernet.

Figure 1:
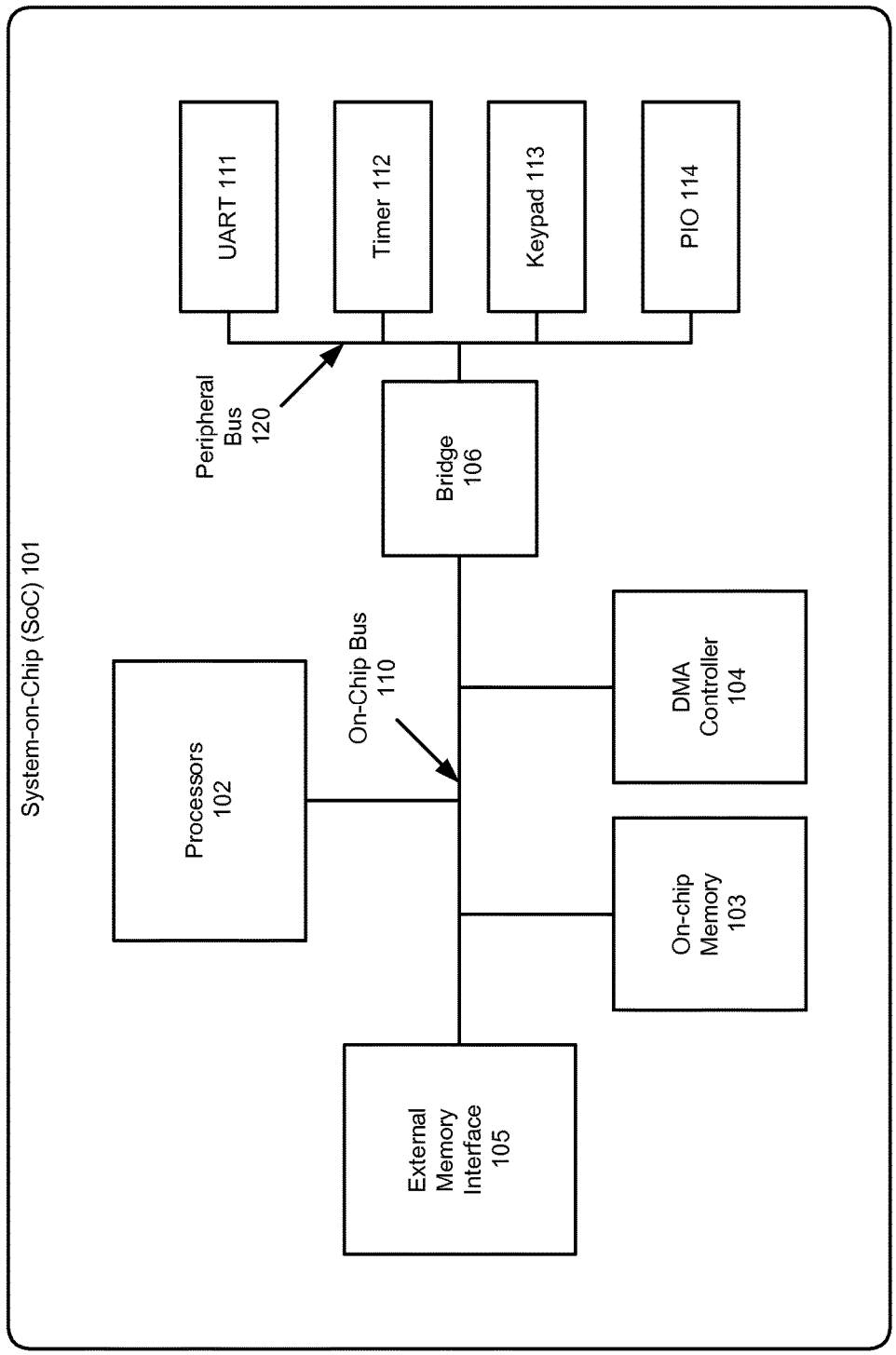
FIG. 1 shows an illustration of an exemplary system-on-chip (SoC) architecture on a device.

FIG. 1 shows an illustration of an exemplary system-on-chip (SoC) architecture on a device in accordance with an embodiment. As shown in FIG. 1, a SoC 101 for a device 100 can include a high performance on-chip bus 110, which interconnects one or more processors 102, an on-chip random-access memory (RAM) 103, a direct memory access (DMA) controller 104, and one or more external memory interfaces 105.

In accordance with an embodiment, the processors 102 in the SoC 101 can include a single-core or multiple-core central processing unit (CPU), a cache component, a graphics processing unit (GPU), a video codec, and a liquid-crystal display (LCD) video interface.

Also, in accordance with an embodiment, the SoC 101 can include a bridge 106 that connects the high performance on-chip bus 110 to a peripheral bus 120, which can be run with a lower bandwidth, using lower power, latched address and control, and simple interface. For example, as shown in FIG. 1, the peripheral bus 120 can provide access to a universal asynchronous receiver/transmitter (UART) 111, a timer 112, a keypad interface 113, and programmed input/output (PIO) interfaces 114.

In accordance with an embodiment, the SoC 101 for the device 100 can establish mobile connectivity using different technologies, such as Bluetooth, Wi-Fi, cellular (3G/4G/LTE/LTE-A) modem, and/or GPS.

The exemplary SoC architecture shown in FIG. 1 is provided for purposes of illustration. In accordance with various embodiments, other types of SoC architecture can be used.

Trusted Execution Environment (TEE)

Figure 2:
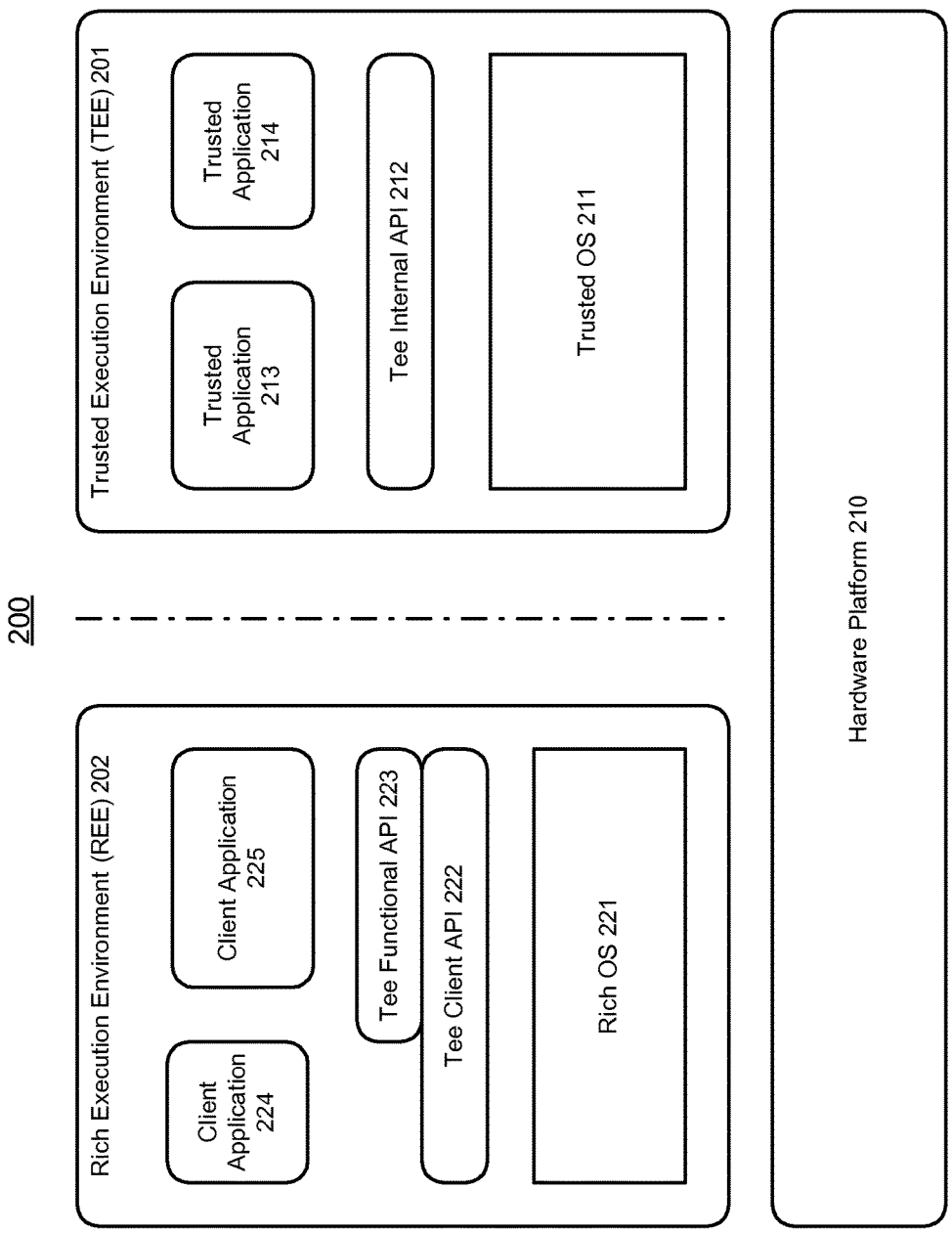
FIG. 2 shows an illustration of supporting a trusted execution environment (TEE) in a system-on-chip (SoC) architecture.

FIG. 2 shows an illustration of supporting a trusted execution environment (TEE) in a system-on-chip (SoC) architecture. As shown in FIG. 2, a SoC 200 architecture enables a device to execute code and to manipulate data in separate execution environments, e.g. a trusted execution environment (TEE) 201 and a rich execution environment (REE) 202.

The REE 202 can include the normal runtime environment based on a rich OS 221 (or the main OS such as Android or iOS), while the TEE 20, which is a secure area isolated from the REE 202, can include the secure runtime environment based on a secure OS (e.g. a trusted OS 211).

As shown in FIG. 2, both the TEE 201 and the REE 202 can run on top of a hardware platform 210. For example, an ARM SoC can provide a hardware mechanism based on the TrustZone technology and its related monitor code. Furthermore, the hardware mechanism 210 can enforce the isolation between the secure runtime environment in TEE 201 (i.e. "the secure world") and the normal runtime environment in REE 202 (i.e. "the normal world"). Also, the hardware mechanism 210 enables the communication between the two worlds.

Alternatively, both the TEE 201 and the REE 202 can be run on top of a hypervisor, instead of running directly on top of the hardware mechanism 210. For example, the hypervisor can host two virtual machines (VMs) with one VM dedicated to host the REE 202 and another VM dedicated to host the TEE 201. Here, in order to support the isolated secure execution, the VM that hosts the TEE 201 can be assigned with higher privileges over the VM that hosts the REE 202.

Furthermore, the SoC 200 can provide a root of trust that is bound to a secure boot mechanism (e.g. based on a boot ROM). The root of trust on a SoC 200 guarantees that the code in a TEE 201 is genuine and that only authorized code can be executed in the TEE 201.

As shown in FIG. 2, the TEE 201 environment allows one or more trusted application (TAs) 213-214 to run on top of the trusted OS 211, e.g. via a TEE internal application programming interface (API) 212. The trusted OS 211 can leverage the security features present on the SoC 200 and can execute the TAs 213-214 in the TEE 201 in a secure fashion.

The TAs 213-214 may need to be signed by an authority, such as an installation authority, before being installed within the TEE 201. Depending on business models and business agreements, the installation authority can be the owner of the device hosting the SoC 200, the OEM or a third party.

Once the TAs 213-214 are installed within the TEE 201, the TAs 213-214 can be stored in a secure file system (SFS), which is managed by the TEE 201. Furthermore, the TA 213-214 can be accessed from the SFS, each time when the TA 213-214 is required. Thus, the TEE 201 can provide secure storage for the TAs 213-214, since the SFS guarantees confidentiality and integrity of the data stored in it.

Also as shown in FIG. 2, the TEE 201 can expose a set of interfaces, such as the TEE client API 222 and the TEE functional API 223, in the REE 202, in order to provide security services to various client applications 224-225 in the REE 202. Additionally, the TEE 201 allows the client applications 224-225 in the REE 202 and the trusted applications 213-214 to use a shared memory for communicating large amounts of data, quickly and efficiently.

Derive Secrets Bound to a Trusted Application (TA)

Figure 3:
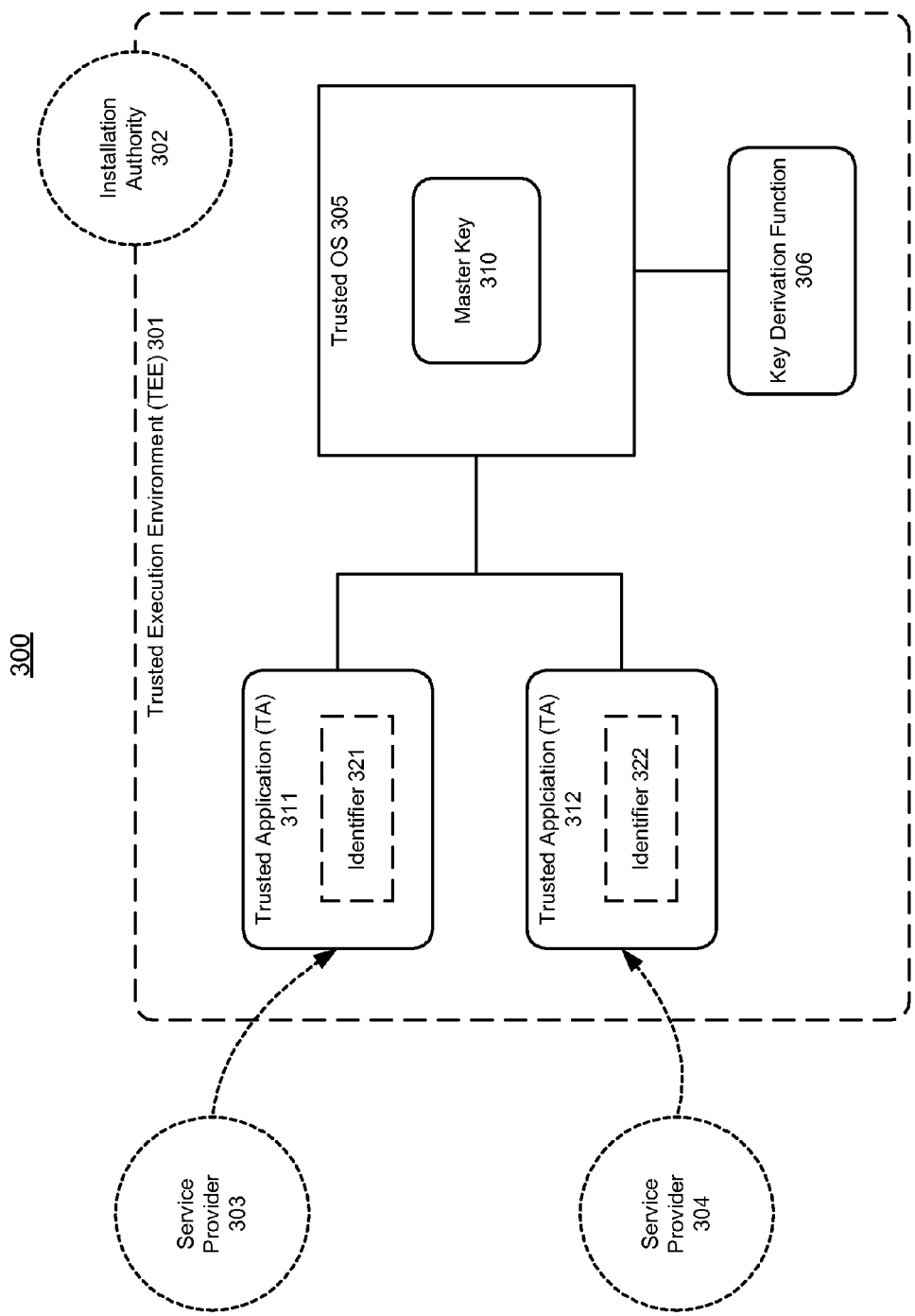
FIG. 3 shows an illustration of supporting secret derivation in a trusted execution environment (TEE), in accordance with an embodiment of the invention.

FIG. 3 shows an illustration of supporting secret derivation in a trusted execution environment (TEE), in accordance with an embodiment of the invention. As shown in FIG. 3, the trusted applications (TAs) 311-312, which may be developed by different service providers 303-304, can be deployed in a TEE 301 that is provided by a SoC 300 on a device.

Furthermore, the TEE 301 environment can include a trusted OS 305, which is able to derive secrets (e.g. various cryptographic keys bound to the device) based on a master key 310 bound to the SoC 300. The root of trust provided by the SoC 300 can guarantee that the trusted OS 305 is the only component on the SoC 300 that is able to derive secrets.

In accordance with an embodiment of the invention, the trusted OS 305 allows the TAs 311-312 to have access to the secret derivation functionality such that the secrets derived from the master key 310 can also be bound to the TAs 311-312.

As shown in FIG. 3, within the TEE 301, each TA 311-312 running on top of the trusted OS 310 can be associated with a unique identifier 321-322. Also, the trusted OS 305 can use a key derivation function (KDF) 306 to derive secrets bound to different TAs 311-312.

For example, the following exemplary KDF can take the master key 310 and a TA identifier 321-322 as internal parameters.

KDF(X)=SHA_256(Master Key|Trusted Application Identifier|X)

Thus, the KDF 306 can generate secrets bound to the device and different individual TAs 311-312.

Furthermore, the service providers 303-304, which develop the TAs 311-312, may rely on an installation authority 302 to affect each individual TA 311-312 with a unique identifier 321-322 and sign each individual TA 311-312.

In the security industry, the service providers 303-304 may be reluctant to have their applications, which contain the business-critical secrets, executed in an environment that is outside of their control, since the service providers 303-304 may need to trust the installation authority 302 for ensuring that no other TA may be affected with the same identifier and signed.

For example, it is possible that a malevolent TA, e.g. TA 312, can be erroneously affected with the identifier 311. Thus, the malevolent TA 312 may be able to access the secrets of the service provider 303 for the TA 311, if the TEE 301 uses the above exemplary KDF for deriving secrets.

Figure 4:
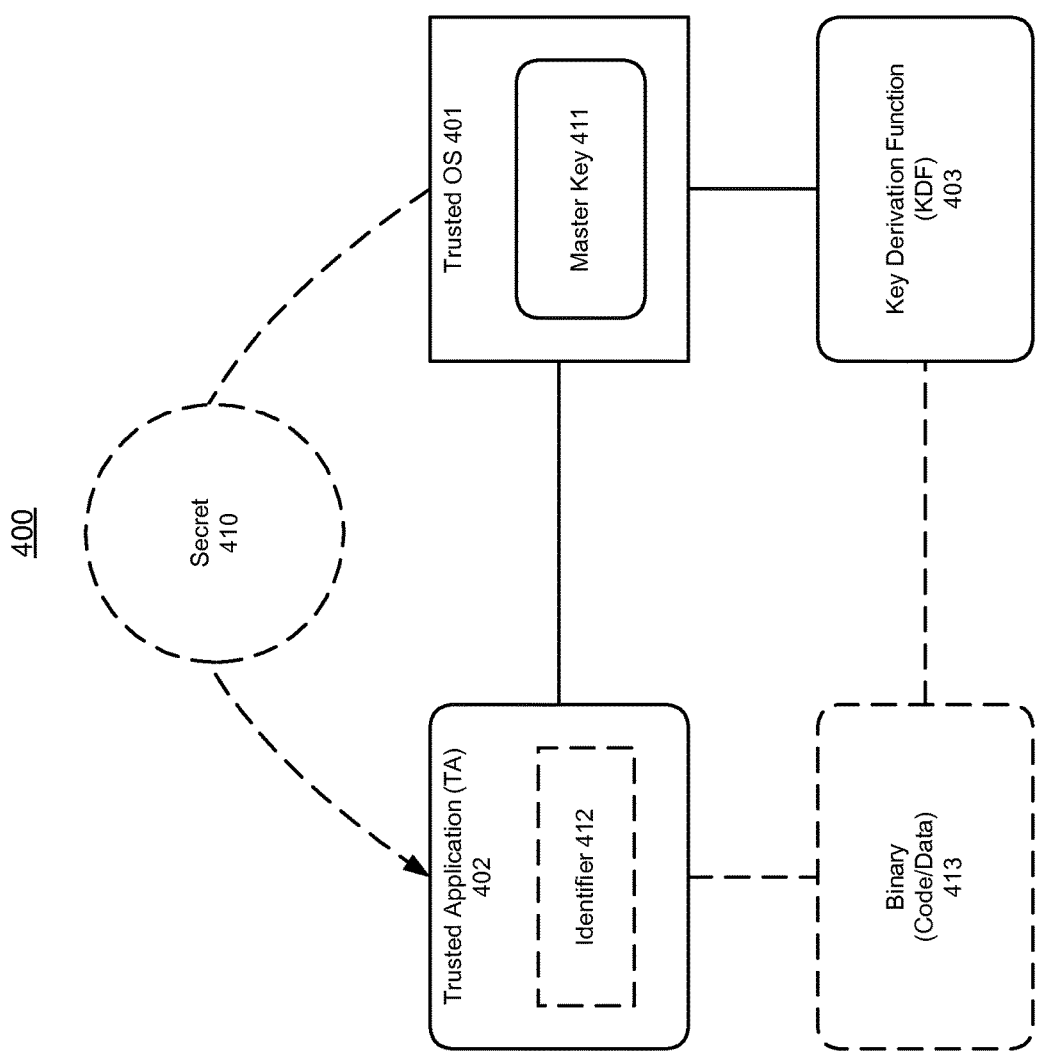
FIG. 4 shows an illustration of deriving secret bound to a trusted application (TA) in a trusted execution environment (TEE), in accordance with an embodiment of the invention.

FIG. 4 shows an illustration of deriving secret bound to a trusted application (TA) in a trusted execution environment (TEE), in accordance with an embodiment of the invention. As shown in FIG. 4, a trusted OS 401 in a TEE 400 can use a key derivation function (KDF) 403 to derive a secret 410 that is bound to a trusted application (TA) 402, based on both a master key 411 maintained by the trusted OS 401 and a unique identifier 412 associated with the TA 402.

Additionally, the trusted OS 401 can take into account the binary (code and/or data) of a TA. For example, the following exemplary KDF can take a resume (e.g. a hash value) of the binary 413 for the TA 402 as an internal parameter.

KDF(X)=SHA_256(Master Key|Trusted Application Identifier|SHA_256(The TA binary)|X)

As shown in the above, the KDF 403 can derive secrets 410 bound only to the TA 402. In other words, the KDF 403 may not derive the same secrets bound to a different TA, even when the different TA has access to the same identifier 412.

Thus, the system can ensure that the service providers are able to put their secrets under control and protect their business.

Figure 5:
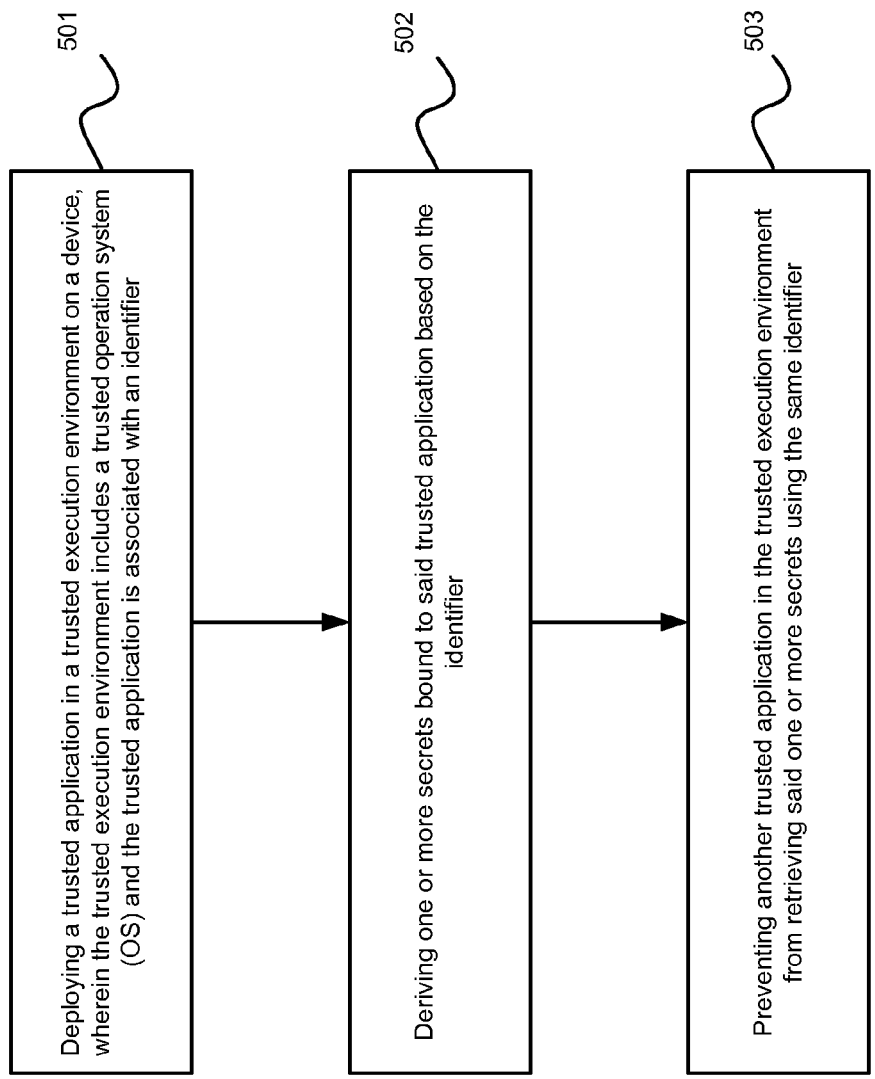
FIG. 5 illustrates an exemplary flow chart for deriving secret bound to a trusted application (TA) in a trusted execution environment (TEE), in accordance with an embodiment of the invention.

FIG. 5 illustrates an exemplary flow chart for deriving secret bound to a trusted application (TA) in a trusted execution environment (TEE), in accordance with an embodiment of the invention. As shown in FIG. 4, at step 501, the system can deploy a trusted application in a trusted execution environment on a device, wherein the trusted execution environment includes a trusted operating system (OS) and the trusted application is associated with an identifier. Then, at step 502, the system can derive one or more secrets bound to said trusted application based on the identifier. Furthermore, at step 503, the system can prevent another trusted application in the trusted execution environment from retrieving said one or more secrets using the same identifier.

Trusted Application (TA) Update Mechanism

In accordance with an embodiment of the invention, the system can guarantee consistency in secret derivation for supporting trusted application (TA) updates.

Figure 6:
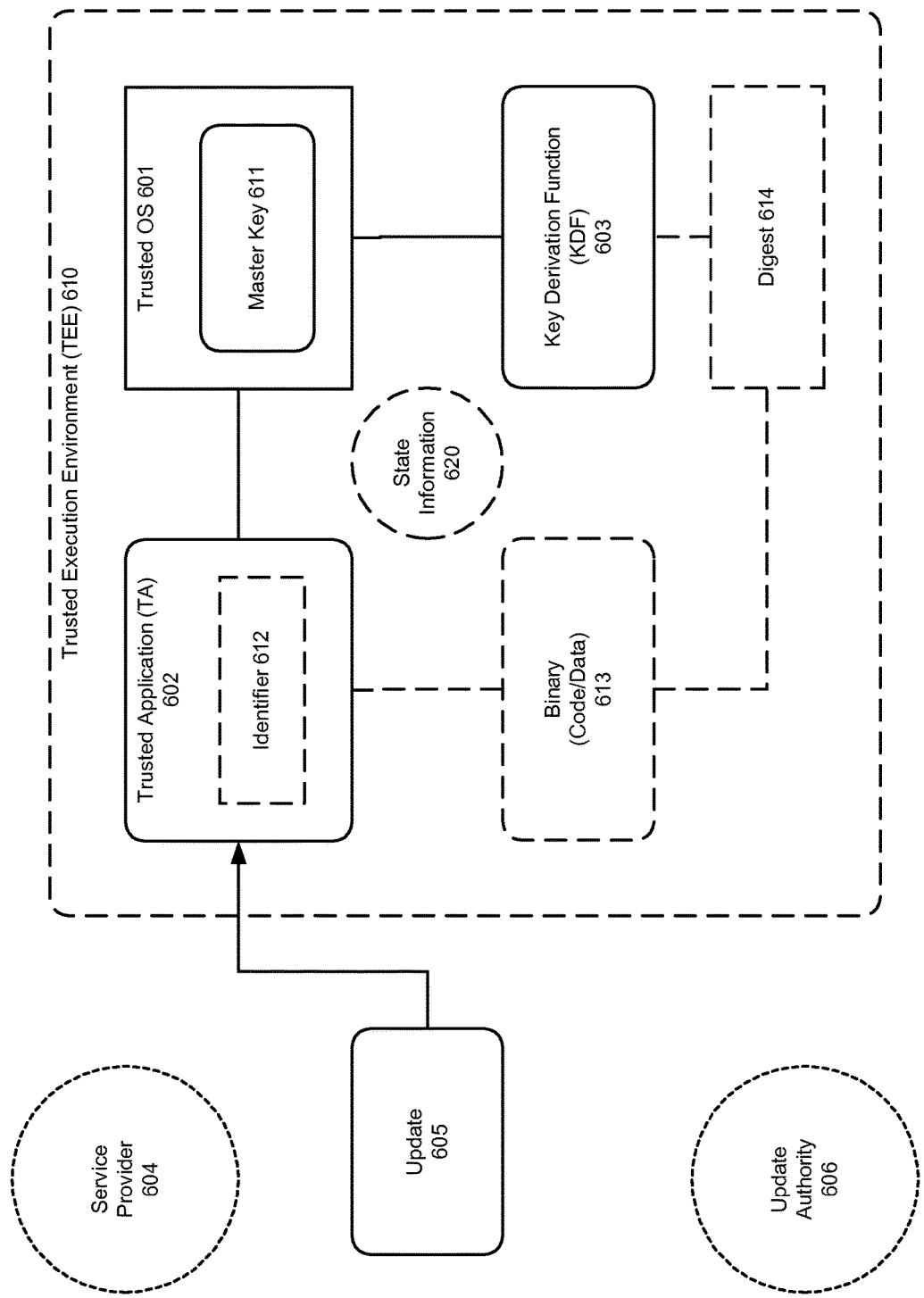
FIG. 6 shows an illustration of supporting a trusted application (TA) update mechanism in a trusted execution environment (TEE), in accordance with an embodiment of the invention.

FIG. 6 shows an illustration of supporting a trusted application (TA) update mechanism in a trusted execution environment (TEE), in accordance with an embodiment of the invention. As shown in FIG. 6, a trusted application (TA) 602 can be deployed in a trusted execution environment (TEE) 610.

The TEE 610 can include a trusted OS 601, which can use a key derivation function (KDF) 603 for deriving secrets bound to the TA 602, based on both a master key 611 maintained in the trusted OS 601 and an unique identifier 612 associated with the TA 602.

Additionally, the trusted OS 610 allows the KDF 603 to take into account the binary (code/data) 613 of the TA 602 in secret derivation. For example, the KDF 603 can take a digest 614 for the binary (code/data) 613 of the TA 602 as a parameter. Here, the digest 614 can be a fixed-size bit string that results from a cryptographic hash function, which takes the binary (code/data) 613 of the TA 602 as the input.

Furthermore, the trusted OS 601 can support and manage an update 605 for the TA 602. As shown in FIG. 6, the TA 602 may be signed by an update authority 606 in order to be updated within the TEE 610. If the KDF 603 is bound to the binary 613 of the TA 602, then the secrets resulting from the KDF 603 may change when the TA 602 is updated and its binary 613 is changed.

In accordance with an embodiment of the invention, the system can guarantee that the KDF 603 is consistent across multiple TA updates.

As shown in FIG. 6, when the service provider 604 for the TA 602 (to be updated) trusts the update authority 606, the system can store state information 620 in the SFS, which indicates whether the TA 602 has already been updated.

For example, when the TA 602 is updated from TA v1.0 to TA v1.1, the trusted OS 601 can store the digest 614 for the binary 613 of the initially installed TA v1.0 within the SFS. Then, the KDF 603 can reuse this stored digest 614 value later on, when the KDF is called by TA v1.1 after the update.

Figure 7:
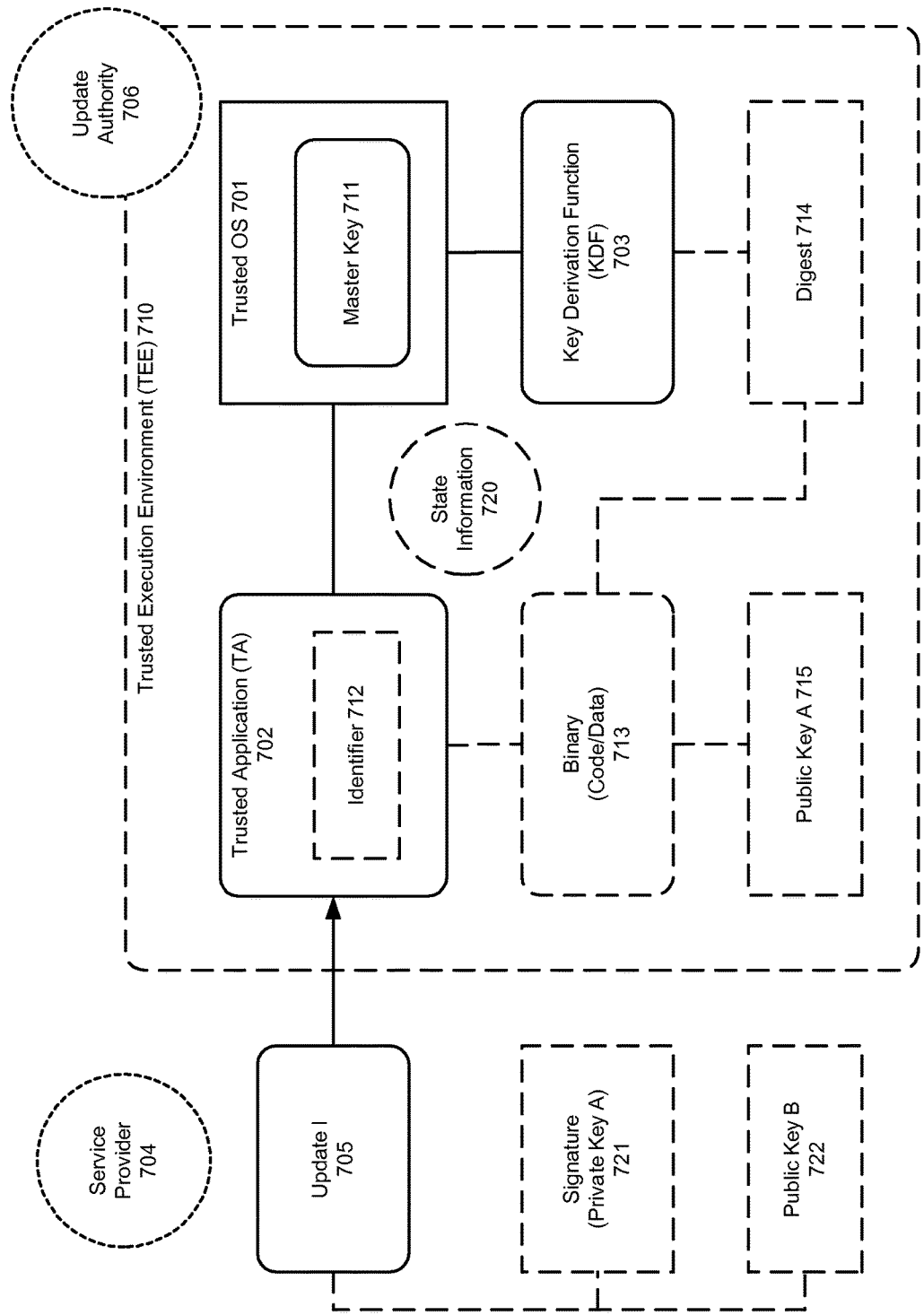
FIG. 7 shows an illustration of providing secure TA updates secure TA updates in a trusted execution environment (TEE), in accordance with an embodiment of the invention.

FIG. 7 shows an illustration of providing secure TA updates in a trusted execution environment (TEE), in accordance with an embodiment of the invention. As shown in FIG. 7, a trusted application (TA) 702 can be deployed in a trusted execution environment (TEE) 710.

The TEE 710 can include a trusted OS 701, which can use a key derivation function (KDF) 703 for deriving secrets bound to the TA 702, based on both a master key 711 maintained in the trusted OS 701 and an unique identifier 712 associated with the TA 702.

Additionally, the trusted OS 710 allows the KDF 703 to take into account the binary (code/data) 713 of the TA 702 in secret derivation. For example, the KDF 703 can take a digest 714 for the binary (code/data) 713 of the TA 702 as a parameter.

For example, when a TA 702 is installed initially (e.g. using TA v1.0), the TA 702 can contain in its data 713 a public key A 715 (e.g. pubKey1).

As shown in FIG. 7, the system can support and manage an update of the TA 702 (e.g. using an update I 705), when the service provider 704 of the TA 702 does not trust the update authority 706.

In accordance with an embodiment of the invention, the service provider 704 can provide the update I 705 for the TA 702 (e.g. TA v1.1). The update I 705 may contain (e.g. in its data) a signature 721 for the binary (code and data) of TA v1.1, which is signed using a private key A (e.g. a privKey1 related to the pubKey1). Also, the service provider 704 can ensure that the update I 705 contains (e.g. in its data) a different public key B 722 (e.g. pubKey2).

Additionally, the trusted OS 701 can also store state information 720 that indicates whether a given TA 702 has been updated or not in the SFS.

Figure 8:
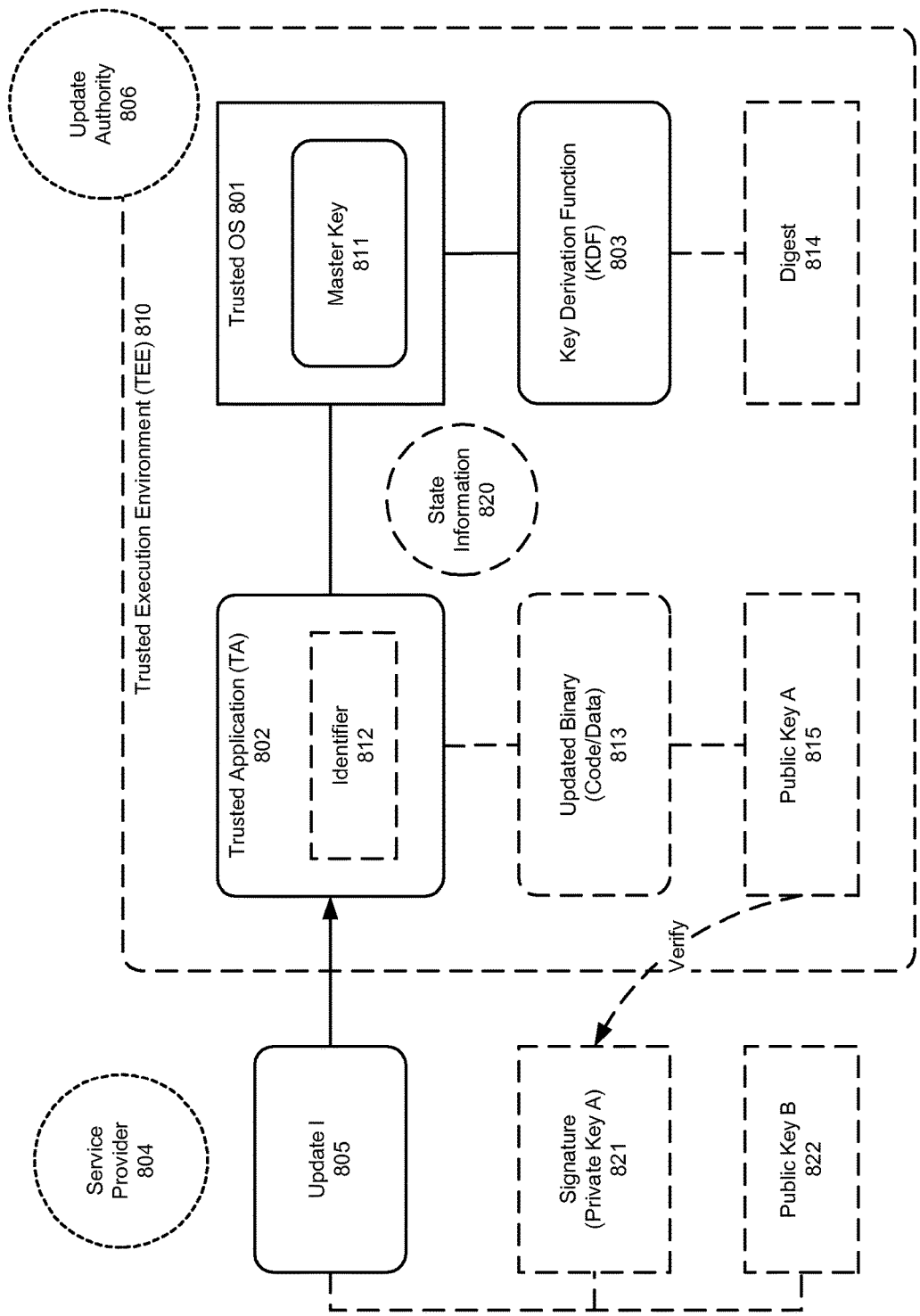
FIG. 8 shows an illustration of updating a trusted application in a trusted execution environment (TEE), in accordance with an embodiment of the invention.

FIG. 8 shows an illustration of updating a trusted application in a trusted execution environment (TEE), in accordance with an embodiment of the invention. As shown in FIG. 8, a trusted application (TA) 802 can be updated in a trusted execution environment (TEE) 810.

For example, the update I 805 includes a signature 821, which is signed using a private key A (i.e. privKey1), and a public key B 822 (i.e. pubKey2).

When the service provider 804 for the TA 802 does not trust the update authority 806, the trusted OS 801 allows the TA 802 to be updated, e.g. from the TA v1.0 into the TA v1.1, only after the signature 821 in the update I 805 is successfully verified against the previously installed public key A 815 (i.e. pubKey1).

Then, the trusted OS 801 in the TEE 810 can use a key derivation function (KDF) 803 for deriving secrets bound to the TA 802, based on both a master key 811 maintained in the trusted OS 801 and an unique identifier 812 associated with the TA 802.

Additionally, the trusted OS 801 has previously stored, in the SFS, the digest 814 for the binary of the initially installed TA 802 (i.e. TA v1.0). Then, the trusted OS 801 allows the KDF 803 to derive secrets bound to the TA 802, based on the stored digest 814 for TA v1.0, rather than a digest for the updated binary (code/data) 813 of the TA (i.e. a digest associated with TA v1.1).

Correspondingly, the trusted OS 801 can also store state information 820 that indicates whether a given TA 802 has been updated or not in the SFS.

Thus, the service provider 804, which is the owner of the public/private key pair (privKey1 and pubKey1), can guarantee that only the TA 802 can have access to the secrets when calling the KDF 803, even after the TA 802 is updated with a different version.

Figure 9:
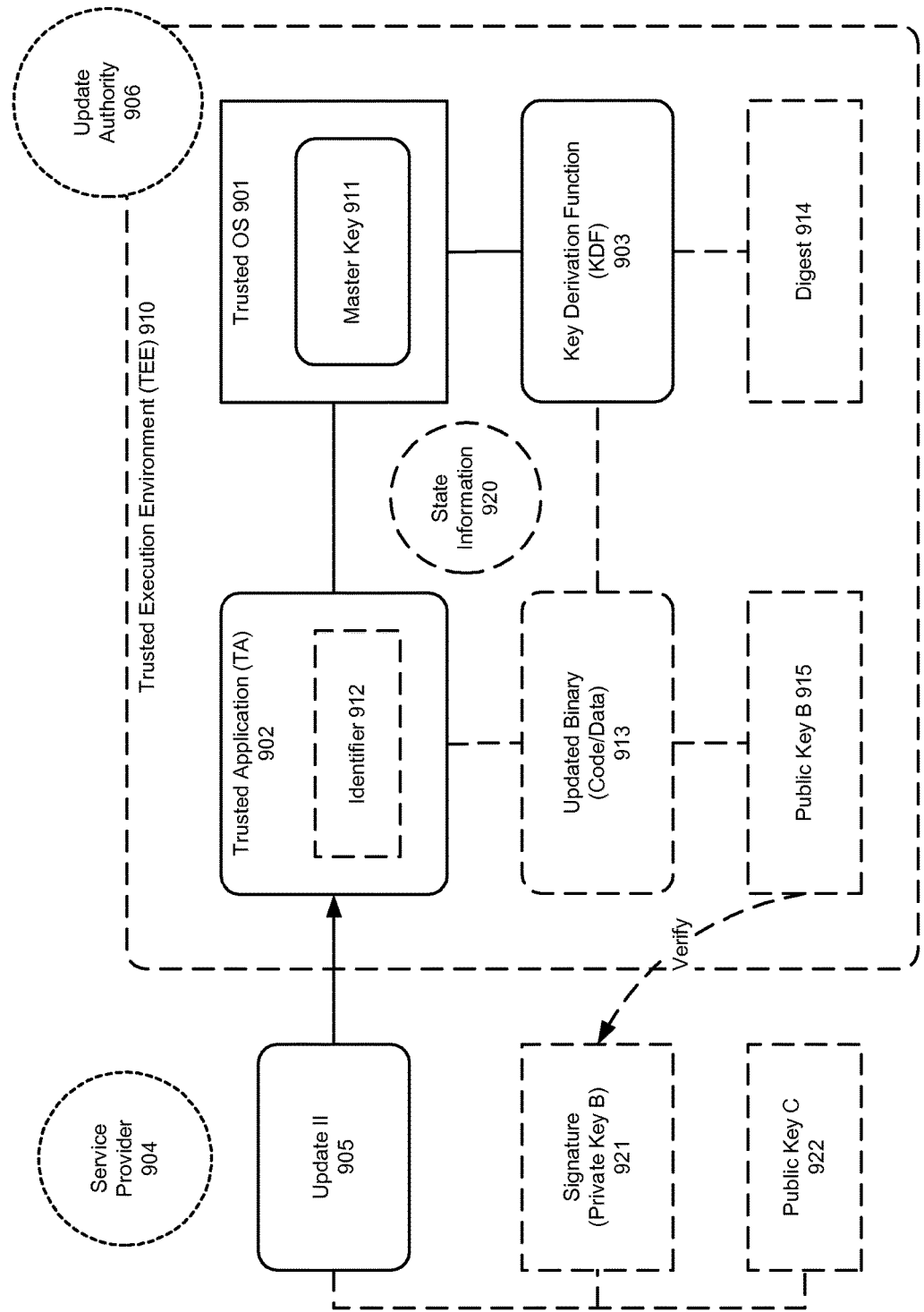
FIG. 9 shows an illustration of further updating the trusted application in a trusted execution environment (TEE), in accordance with an embodiment of the invention.

FIG. 9 shows an illustration of further updating the trusted application in a trusted execution environment (TEE), in accordance with an embodiment of the invention. As shown in FIG. 9, a trusted application (TA) 902 can be updated in a trusted execution environment (TEE) 910.

For example, the service provider 904 can ensure that the update II 905 includes (e.g. in its data) a signature 921, which is signed using a private key B (e.g. privKey2), and a public key C 922 (e.g. pubKey3).

When the service provider 904 for the TA 902 does not trust the update authority 906, the trusted OS 901 allows the TA 902 to be updated from the TA v1.1 into the TA v1.2, only after the signature 921 in the update II 905 is successfully verified against the previously installed public key B 915 (i.e. pubKey2).

The TEE 910 can include a trusted OS 901, which can use a key derivation function (KDF) 903 for deriving secrets bound to the TA 902, based on both a master key 911 maintained in the trusted OS 901 and an unique identifier 912 associated with the TA 902.

Additionally, the trusted OS 901 in the TEE 910 has previously stored, in the SFS, the digest 914 for the binary of the initially installed TA 902 (i.e. TA v1.0). Then, the trusted OS 901 allows the KDF 903 to derive secrets bound to the TA 902, based on the stored digest 914 for TA v1.0, rather than a digest for the updated binary (code/data) 913 of the TA (i.e. a digest associated with TA v1.2).

Correspondingly, the trusted OS 801 can also store state information 820 that indicates whether a given TA 802 has been updated or not in the SFS.

Thus, the service provider 904, which is the owner of the public/private key pair (privKey2 and pubKey2), can guarantee that only the TA 902 can have access to the secrets when calling the KDF 903, even after the TA 802 is updated with multiple different versions.

In accordance with an embodiment of the invention, the system can use the same key pair for all versions of the TA 902, rather than having a new key pair for each different version of the TA 902.

FIG. 10 illustrates an exemplary flow chart for supporting TA updates in a trusted execution environment (TEE), in accordance with an embodiment of the invention. As shown in FIG. 10, at step 1001, a trusted operating system (OS) in a trusted execution environment can store a digest for one or more binary files, which are associated with a trusted application that is deployed in the trusted execution environment. Then, at step 1002, the system can update the trusted application based on one or more updates received from a service provider. Furthermore, at step 1003, the trusted OS can derive at least one secret bound to the updated trusted application using the digest stored by the trusted OS in the trusted execution environment.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A non-transitory computer readable medium comprising instructions which, when executed by one or more hardware processors, cause performance of operations comprising:
   storing a digest of a first set of one or more binary files of a first version of a trusted application, wherein the first set of one or more binary files comprises at least one of: (a) code of the first version of the trusted application and (b) data of the first version of the trusted application, and wherein the first version of the trusted application is deployed in a trusted execution environment;
   generating a first secret, bound to the first version of the trusted application, by applying a key derivation function to at least the digest of the first set of one or more binary files of the first version of the trusted application;
   wherein the first secret is used to encrypt information processed by the first version of the trusted application;
   updating the first version of the trusted application to provide an updated version of the trusted application based on one or more updates from a service provider, wherein the updated version of the trusted application is different than the first version of the trusted application; and
   generating a second secret, bound to the updated version of the trusted application, by applying the key derivation function to at least the digest of the first set of one or more binary files of the first version of the trusted application but not to any digest of a second set of one or more binary files of the updated version of the trusted application;
   wherein the second secret is used to encrypt information processed by the updated version of the trusted application.

2. The medium of claim 1, wherein the operations further comprise:
   using a secure file system managed by the trusted execution environment to store the digest of the first set of one or more binary files.

3. The medium of claim 1, wherein the operations further comprise:
   storing state information, which indicates whether the trusted application has been updated, in the trusted execution environment.

4. The medium of claim 1,
   wherein the first set of one or more binary files of the first version of the trusted application includes a public key.

5. The medium of claim 4,
   wherein the updated version of the trusted application includes a signature that is signed using a private key.

6. The medium of claim 1, wherein the operations further comprise:
   using the public key to verify the signature, in order to validate the updated version of the trusted application.

7. The medium of claim 1, wherein said digest of the first set of one or more binary files of the first version of the trusted application comprises a fixed-size bit string resulting from a cryptographic hash of the first set of one or more binary files of the first version of the trusted application.

8. The medium of claim 1, wherein the operations further comprise:
   using a master key maintained by a trusted OS in the trusted execution environment as a parameter for the key derivation function.

9. The medium of claim 1,
   wherein a system-on-chip supports the trusted execution environment.

10. The medium of claim 1, wherein the operations further comprise:
    providing a root of trust that guarantees a trusted OS to be a only component that is able to derive secrets in the trusted execution environment.

11. A system, comprising:
    one or more microprocessors;
    a trusted execution environment running on the one or more microprocessors;
    the system being configured to perform operations comprising:
       storing a digest of a first set of one or more binary files of a first version of a trusted application, wherein the first set of one or more binary files comprises at least one of: (a) code of the first version of the trusted application and (b) data of the first version of the trusted application, and wherein the first version of the trusted application is deployed in a trusted execution environment;
       generating a first secret, bound to the first version of the trusted application, by applying a key derivation function to at least the digest of the first set of one or more binary files of the first version of the trusted application;
       wherein the first secret is used to encrypt information processed by the first version of the trusted application;
       updating the first version of the trusted application to provide an updated version of the trusted application based on one or more updates from a service provider, wherein the updated version of the trusted application is different than the first version of the trusted application; and generating a second secret, bound to the updated version of the trusted application, by applying the key derivation function to at least the digest of the first set of one or more binary files of the first version of the trusted application but not to any digest of a second set of one or more binary files of the updated version of the trusted application;

wherein the second secret is used to encrypt information processed by the updated version of the trusted application.

12. The system of claim 11, wherein the operations further comprise: using a secure file system managed by the trusted execution environment to store the digest of the first set of one or more binary files.

13. The system of claim 11, wherein the operations further comprise: storing state information, which indicates whether the trusted application has been updated, in the trusted execution environment.

14. The system of claim 11, wherein the first set of one or more binary files of the first version of the trusted application includes a public key.

15. The system of claim 14, wherein the updated version of the trusted application includes a signature that is signed using a private key.

16. The system of claim 15, wherein the operations further comprise: using the public key to verify the signature, in order to validate the updated version of the trusted application.

17. The system of claim 11, wherein said digest of the first set of one or more binary files of the first version of the trusted application comprises a fixed-size bit string resulting from a cryptographic hash of the first set of one or more binary files of the first version of the trusted application.

18. The system of claim 11, wherein the operations further comprise: using a master key maintained by a trusted OS in the trusted execution environment as a parameter for the key derivation function.

19. The system of claim 11, wherein a system-on-chip supports the trusted execution environment, and a root of trust guarantees that a trusted OS is only component that is able to derive secrets on the system-on-chip.

20. A method comprising:

storing a digest of a first set of one or more binary files of a first version of a trusted application, wherein the first set of one or more binary files comprises at least one of: (a) code of the first version of the trusted application and (b) data of the first version of the trusted application, and wherein the first version of the trusted application is deployed in a trusted execution environment;

generating a first secret, bound to the first version of the trusted application, by applying a key derivation function to at least the digest of the first set of one or more binary files of the first version of the trusted application;

wherein the first secret is used to encrypt information processed by the first version of the trusted application;

updating the first version of the trusted application to provide an updated version of the trusted application based on one or more updates from a service provider, wherein the updated version of the trusted application is different than the first version of the trusted application; and generating a second secret, bound to the updated version of the trusted application, by applying the key derivation function to at least the digest of the first set of one or more binary files of the first version of the trusted application but not to any digest of a second set of one or more binary files of the updated version of the trusted application;

wherein the second secret is used to encrypt information processed by the updated version of the trusted application.

* * * * *